July 28, 1959 J. MITCHELL 2,896,460
VARIABLE SPEED BELT TRANSMISSION MECHANISM
Filed Feb. 25, 1955 2 Sheets-Sheet 1

Inventor
James Mitchell
By
Bailey, Stephens and Huettig
Attorneys

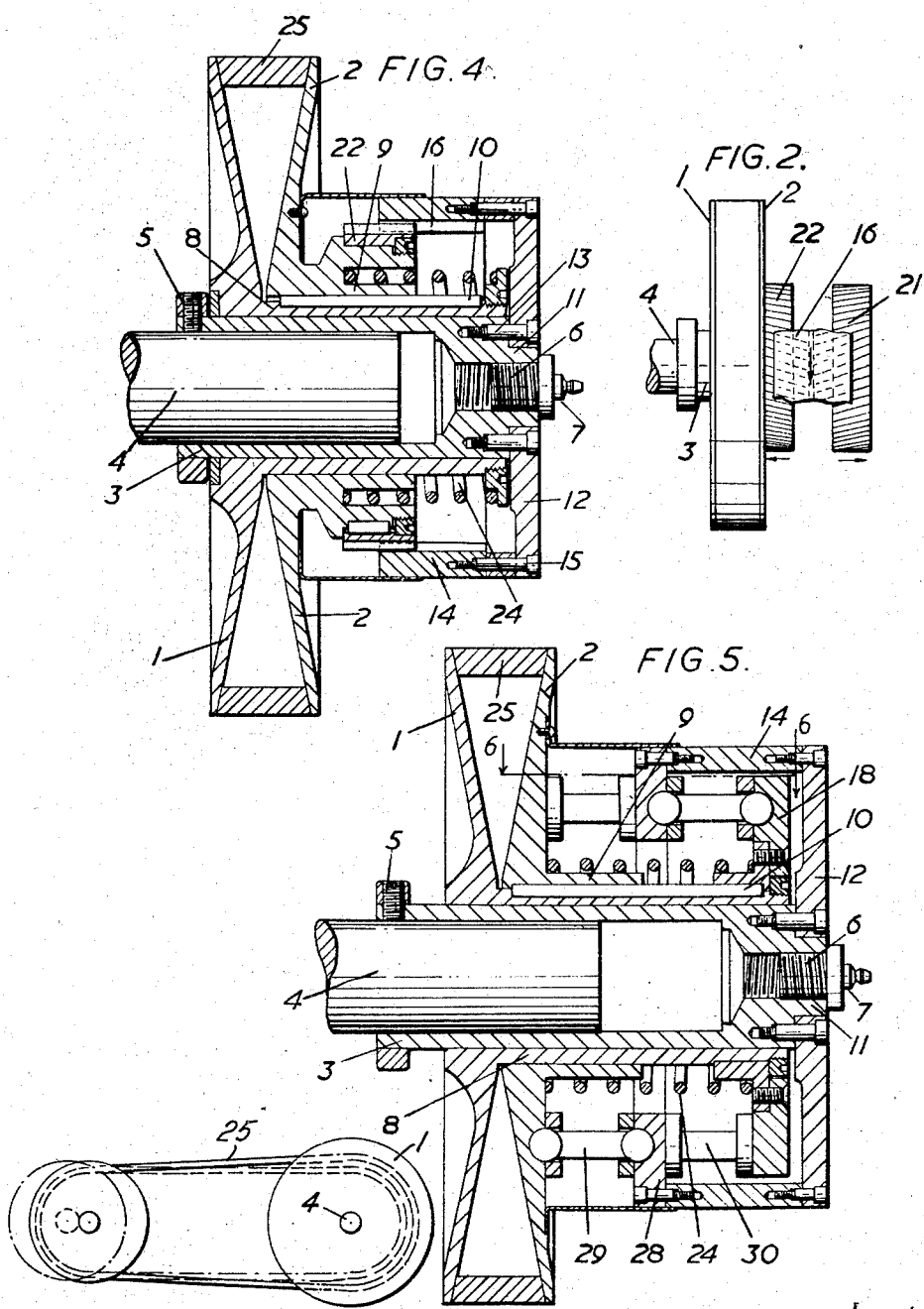

2,896,460

VARIABLE SPEED BELT TRANSMISSION MECHANISM

James Mitchell, Marfleet, Hull, England, assignor to J. H. Fenner and Company Limited, Hull, England, a British company Application February 25, 1955, Serial No. 490,622

5 Claims. (Cl. 74—230.17)

This invention is concerned with variable speed belt transmission mechanism of the type in which pulleys are used having conical flanges which can be moved apart against spring action or allowed to come nearer together, in order to vary the effective diameter for transmission purposes. The flanges are pressed toward one another by powerful springs and the speed variation between driving and driven shafts is secured by moving the axis of one pulley towards or away from that of the other, or by the use of a jockey pulley altering the run of the belt. One convenient arrangement is that in which the expanding pulley is on the shaft of an electric motor mounted to slide on a base and to be adjusted nearer to or further from a driven shaft by a screw and hand-wheel. In this case if the motor carrying the expansible pulley is moved further away from the driven shaft the pull of the belt forces apart the flanges on the driving shaft reducing the effective diameter of the driving pulley and so reducing the speed of power transmission. Adjusting the driving motor nearer to the driven shaft gives the reverse effect, allowing the flanges to move together and making the pulley effectively one of larger diameter so as to increase the driving speed.

The driving belt is either V-shaped in section or has its sides inclined so as to co-operate effectively with the conical flanges of the pulley. The expanding pulley can be either on the driving or on the driven shaft and its use on the driving shaft has only been mentioned as being generally the most convenient arrangement. The driven pulley may be a plain or grooved pulley of fixed diameter or may be itself adjustable in diameter if required.

The invention is applicable both to single and to multiple grooved pulleys, and to pulleys in which one conical flange only moves, but the most largely used type is that having a single groove with conical flanges both of which move simultaneously in adjusting the effective pulley diameter. In this connection the invention enables the belt tension to be kept substantially constant as the effective pulley diameter is varied, but at the same time it enables the belt tension to be reduced when required, i.e. when full power is not being transmitted.

In accordance with the invention, a variable speed transmission comprises two pulleys and a V belt with either means for adjusting the distance between the axes of the pulleys, or means for adjusting the run of the belt, one of the pulleys having conical flanges which are movable together and apart from one another, mechanism urging the flanges together in response to the torque transmitted by the pulley, and a spring also urging the flanges together, the rate of the spring being so related to the action of the mechanism that under maximum power conditions the total force urging the flanges together is substantially constant throughout the range of effective diameters of the pulley.

In mathematical terms there is spring means urging said flanges toward each other with a first component of force, and mechanism for urging said flanges toward each other with a second component of force in response to the torque transmitted by said flanges, the two components of force being each related linearly to the effective diameter, the linear coefficients satisfying the following mathematical relations $$\frac{Q}{K} = -\frac{T_{max}}{2}(1 - e^{-\mu\alpha/\sin\theta})$$

$$P_0 - Qd_0 = \frac{T_{max}}{2}\frac{\cos\theta}{\mu}(1 - e^{-\mu\alpha/\sin\theta})$$

where:

$Q$ is the rate of change with effective diameter of the first component of force.

$K$ is the rate of change with effective diameter of the second component of force for unit difference in the tensions of the belt on reaching and leaving the flanges.

$T_{max}$ is the maximum permissible tension in the belt.

$e$ is the base of natural logarithms.

$\mu$ is the coefficient of friction between the belt and the flanges.

$\alpha$ is the angle of embrace of the belt around the flanges.

$\theta$ is the semi-angle of the V between the flanges.

$P_0$ is the value of the first component of force when the effective diameter has an arbitrary datum value $d_0$.

The mechanism for urging the flanges together may include helical ribs and grooves on a member fast with a shaft carrying the pulley and corresponding grooves and ribs on a member fast with the flange or each flange. Alternatively, the mechanism may comprise toggles which straighten in response to increase in torque, thus axially displacing a flange.

The invention is illustrated in the accompanying drawings in which:

Figure 1a is a diagrammatic view showing the pulley of Figure 1 in a two pulley transmission;

Figure 2 is an explanatory diagram for the structure of Figure 1;

Figure 4 is a longitudinal section similar to Figure 1, but showing a pulley in which one flange is fixed longitudinally to the shaft, but is free to rotate on the sleeve 3;

Figure 5 is a longitudinal section of a pulley in which the flanges are moved by a toggle mechanism.

Figure 6:
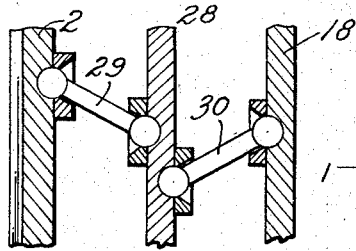
Figure 6 is an enlarged fragmentary detail cross-sectional view of the toggles taken on line 6—6 of Figure 5.
Figure 1:
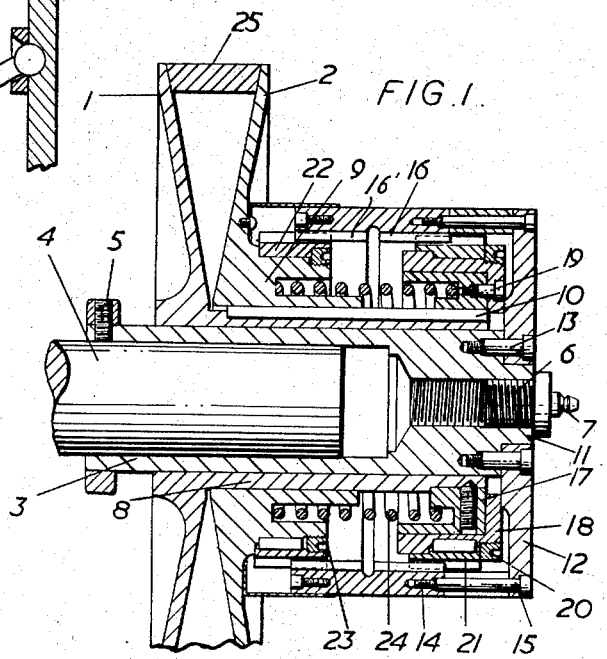
Figure 1 is a longitudinal section through a pulley in which the flanges are moved by helical grooves and ribs.

Referring to Figures 1 and 2 the pulley comprises two flanges 1, 2 mounted upon a sleeve 3 which is fixed to a shaft 4 so as to rotate therewith and held in position by a key and grub screw 5. The sleeve is drilled to accommodate a plug 6 fitted with a grease nipple 7 by which the internal parts of the mechanism are lubricated through channels not shown and which may be removed and replaced by a draw bolt if it is required to remove the sleeve 3 from the shaft 4.

The flange 1 is carried by a sleeve 8 which is a sliding fit on the sleeve 3 and the flange 2 is carried by an outer sleeve 9 which is secured to the sleeve 8 by a key 10. Pressed on to a spigot 11 on the end of the sleeve 3 is an end disc 12 which is secured to the sleeve 3 by grub screws 13 and which carries an outer casing 14 secured to it by screws 15 and distance pieces. The outer casing 14 is provided with helical internal ribs and grooves, generally indicated at 16, and ribs and grooves of opposite hand generally indicated at 16'. The sleeve 8 is keyed to a cup 17 fixed to a housing 18 by screws 19, to which is fixed by a screwed ring 20, a further ring 21 having external grooves and ribs which engage the internal ribs and grooves 16 of the casing 14. A similar ring 22 having external helical grooves and ribs of opposite hand is secured to the sleeve 9 by a screwed ring 23 and engages the ribs and grooves 16'. A coil compression spring 24 is located between recessed portions of the sleeve 9 and cup 17. The construction of these parts is occasioned by the necessity to make the spring 24 readily replaceable and to provide that the direction of the internal ribs and grooves in the threaded part 16 of the casing 14, and the corresponding grooves and ribs on the rings 21 and 22 shall be interchangeable for clockwise or anti-clockwise drive.

With the arrangement as shown the spring 24 urges the flanges 1, 2 together, the normal rest position being with the flanges close together and the V-belt 25 between them at the outermost position. When drive is being transmitted the tensions in the tight and slack runs of the belt are in equilibrium with the forces applied to the flanges by the rings 21, 22 and by the spring 24. These forces will be referred to as "the torque force" and "the spring force" respectively. If the flanges are permitted to move together, either by moving one of the pulleys in the transmission or by moving a jockey pulley or the equivalent, then the spring force decreases and the torque force increases. The decrease in the spring force is proportional to the relative movement of the flanges. The increase in the torque force is proportional to the increase in effective diameter of the pulley and so is likewise proportional to the relative movement of the flanges. The increase in the torque force is also proportional to the difference between the tensions in the tight and slack runs of the belt, and the rate of the spring pressure is so chosen that under maximum power conditions, i.e. when this difference is as great as is possible without undue slipping of the belt, then the decrease in the spring force and the increase in the torque force are equal. That is to say the sum of the spring force and the torque force remains constant despite movement of the flanges. In consequence the tensions in the tight and slack runs of the belt also remain constant. This means that if the tensions in the belt are made as high as the strength of the belt permits for one particular velocity ratio of the transmission they will remain so at other velocity ratios.

If the transmission is not operating under maximum power conditions then the torque force will be less and will increase at a lesser rate as the effective diameter increases. Accordingly the total force urging the flanges together will be less and will decrease somewhat as the effective diameter increases, and the tensions in the belt will change correspondingly.

Figure 3:
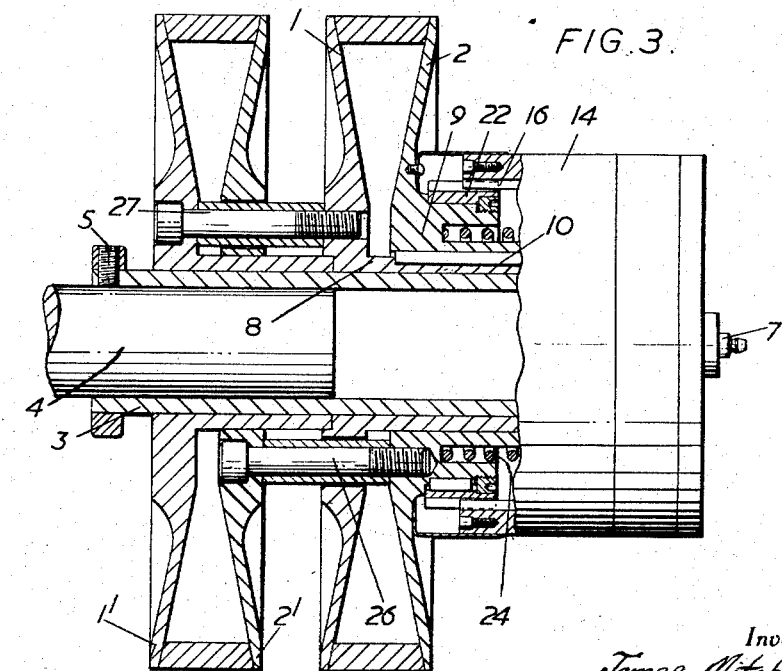
Figure 3 is a longitudinal section similar to Figure 1 but showing a multiple groove pulley.

In the form shown in Figure 3 the arrangement of parts is very similar but the flange 1 is coupled to a second flange 1' through a bolt 27 whilst the flange 2 is coupled to the flange 22' through a bolt 26.

The arrangement shown in Figure 4 is one in which the flange 1 is stationary whilst the flange 2 only moves. The sleeve 8 is not free to move axially on the shaft but the sleeve 9 is free to slide and is urged partly by the spring 24 and partly by the engaging ribs and grooves on the part 16 of the casing 14 and on the ring 22. The ring 21 shown in Figure 1 which there controlled the position of the second flange is not present in the form shown in Figure 4.

In Figure 5 both flanges move but their position is controlled partly by the spring 24 and partly by toggles. In this form the casing 14 carries a ring 28 in which is supported the mid point of a toggle linkage composed of links 29, 30, the outer ends of which are supported respectively by the flange 2 and by the ring 18 which is carried by the sleeve 8. As the torque transmitted by the pulley increases, the ring 28 is caused to rotate relatively to the flanges 1, 2. Consequently the angle between the toggle links 29, 30 increases and the flange 2 is forced from the ring 28, thus bringing the flanges 1, 2 nearer together. In Figure 5, the flanges are shown at the limit of their movement together.

Having now described the means by which the objects of the invention are obtained, I claim:

1. A variable speed transmission comprising two pulleys, a V belt extending between said pulleys with said pulleys being adaptable for either adjusting the run of said belt or by varying the distance between the axes of the pulleys, one of said pulleys having conical flanges movable toward and away from each other, a coil spring coaxial with said one of said pulleys and bearing against the hub portion of one of said flanges, mechanism means contacting the other end of the spring for urging said flanges toward each other in response to the torque transmitted by the pulley, and the rate of the spring pressure being related to the action of the mechanism means so that under maximum power conditions the total force urging the flanges together is substantially constant throughout the range of the effective diameters of the flanges of the pulley.

2. A variable speed transmission as in claim 1, said mechanism means comprising a shaft carrying said one pulley, a member fixed to the pulley shaft, a second member fixed to a movable pulley flange, and interengaged helical ribs and grooves between the two members.

3. A variable speed mechanism as in claim 1, said mechanism means extending between said one of said flanges and the other end of said spring further comprising toggles adapted to straighten upon increase in the torque.

4. In a variable diameter pulley producing a constant pressure on the belt over varying effective pulley diameters and composed of two flanges axially movable on a pulley shaft, the improvement comprising a first flange having a first sleeve mounted on said shaft, a second flange having a second sleeve axially slidably mounted upon said first sleeve, an end disc secured to said shaft, spring means interposed between said disc and second flange for urging said flanges toward each other, a casing fastened to said end disc, and means interconnecting said casing and said second sleeve for changing the spring pressure upon rotation of said second flange in response to the torque applied to said second flange by the pulley belt, with the rate of the spring pressure being related to force of the interconnecting means so that under maximum pulley power conditions the total force urging the flanges together is substantially constant throughout the range of the effective diameters of the flanges of the pulley.

5. In a variable speed transmission having two pulleys, a V-belt extending between said pulleys, and one of said pulleys having conical flanges movable toward and away from each other, the improvement comprising spring means urging said flanges toward each other with a first component of force, mechanism for urging said flanges toward each other with a second component of force in response to the torque transmitted by said flanges, and means for varying the effective diameter of said one of said pulleys at which said belt runs on said flanges, the two components of force being each related linearly to the effective diameter, the linear coefficients satisfying the following mathematical relations $$\frac{Q}{K} = -\frac{T_{max}}{2}(1 - e^{-\mu\alpha/\sin\theta})$$

$$P_0 - Qd_0 = \frac{T_{max}}{2}\frac{\cos\theta}{\mu}\left(1 - e^{\frac{-\mu\alpha}{\sin\theta}}\right)$$

where:

$Q$ is the rate of change with effective diameter of the first component of force.

$K$ is the rate of change with effective diameter of the second component of force for unit difference in the tensions of the belt on reaching and leaving the flanges.

$T_{max}$ is the maximum permissible tension in the belt.

$e$ is the base of natural logarithms.

$\mu$ is the coefficient of friction between the belt and the flanges.

$\alpha$ is the angle of embrace of the belt around the flanges.

$\theta$ is the semi-angle of the V between the flanges.

$P_0$ is the value of the first component of force when the effective diameter has an arbitrary datum value $d_0$.

References Cited in the file of this patent

UNITED STATES PATENTS

| | | |
|---|---|---|
| 1,279,547 | Hueber | Sept. 24, 1918 |
| 2,054,564 | Quiroz | Sept. 15, 1936 |
| 2,168,744 | Perrine | Aug. 8, 1939 |
| 2,478,289 | Lemon | Aug. 9, 1949 |
| 2,694,316 | Hultin | Nov. 16, 1954 |
| 2,699,071 | Miner | Jan. 11, 1955 |

FOREIGN PATENTS

| | | |
|---|---|---|
| 299,013 | Switzerland | Aug. 2, 1954 |